(12) United States Patent
Chamley et al.

(10) Patent No.: US 6,223,991 B1
(45) Date of Patent: May 1, 2001

(54) PROCESS FOR MANAGING THE MEMORY RESOURCES IN A MICROCIRCUIT CARD

(75) Inventors: Olivier Chamley, Cabanac; Isaac-Jacques Soussana, Boulogne, both of (FR)

(73) Assignee: De la rue Cartes et Systemes, Paris (FR)

( * ) Notice: Subject to any disclaimer, the term of this patent is extended or adjusted under 35 U.S.C. 154(b) by 0 days.

(21) Appl. No.: 09/190,615

(22) Filed: Nov. 12, 1998

(30) Foreign Application Priority Data

Dec. 3, 1997 (FR) .................................................... 9715213

(51) Int. Cl.[7] .................................................... G06K 5/00
(52) U.S. Cl. ........................................... 235/492; 235/380
(58) Field of Search .................................... 235/492, 375, 235/380, 381, 383, 451, 487, 493, 494; 902/4, 26, 27

(56) References Cited

U.S. PATENT DOCUMENTS

| | | | |
|---|---|---|---|
| 4,204,113 | * 5/1980 | Giraud et al. .......................... | 235/375 |
| 4,912,629 | 3/1990 | Shuler, Jr. .............................. | 364/200 |
| 4,992,646 | * 2/1991 | Collin .................................. | 235/375 |
| 4,992,651 | 2/1991 | Takahira ............................... | 235/492 |
| 5,159,678 | 10/1992 | Wengelski et al. ..................... | 398/425 |
| 5,191,193 | * 3/1993 | Le Roux ............................... | 235/379 |
| 5,285,415 | * 2/1994 | Depret et al. ..................... | 235/350 X |
| 5,386,539 | * 1/1995 | Nishi ............................... | 235/492 X |
| 5,495,098 | * 2/1996 | Pailles et al. ......................... | 235/492 |
| 5,536,923 | * 7/1996 | Foglino ................................ | 235/380 |
| 5,629,513 | * 5/1997 | Geronimi et al. ..................... | 235/432 |
| 5,847,374 | * 12/1998 | Menconi .............................. | 235/492 |

FOREIGN PATENT DOCUMENTS 0 282 787 A2    9/1988    (EP) .
2 613 851-A1    10/1988    (FR) .

* cited by examiner

*Primary Examiner*—Mark Tremblay
(74) *Attorney, Agent, or Firm*—Oliff & Berridge, PLC

(57) ABSTRACT

Process for reclaiming storage spaces in a microcircuit card when they are no longer used by the references of the system. Each storage space ($EM_1$–$EM_4$) is provided with a header ($E_1$–$E_4$) containing a number of references representative at any moment of a plurality of references requesting the data of the corresponding storage space. The headers form the object of chaining (Ch) and a storage space the number of references of which has been reduced to zero can be re-allocated. Under certain conditions, available and adjacent storage spaces can be merged.

15 Claims, 1 Drawing Sheet

PROCESS FOR MANAGING THE MEMORY RESOURCES IN A MICROCIRCUIT CARD

BACKGROUND OF THE INVENTION

1. Field of Invention

The invention relates to the management of the memory resources in a microcircuit card, more commonly referred to as a smart card. It relates more particularly to an improvement for re-allocating storage spaces by giving the card operating system the task of reclaiming the allocated memory, irrespective of whether this is a read-write memory (usually a "RAM"-type volatile memory) or a reprogrammable read-only memory (usually an "$E^2$ PROM"-type or "FLASH"-type alterable non-volatile memory).

2. Description of Related Art

Although the memory resources in microcircuit cards are gradually increasing as a result of more efficient new components, they are relatively limited. It is nevertheless becoming possible and advantageous to carry out dynamic storage allocations. However, it is preferable not to leave the de-allocation of the storage spaces already allocated to the initiative of the programmer as a result of possible programming errors and errors in the additional code then required. The latter would then reside in the applications and not in the card operating system. It might consume the reprogrammable read-only memory, a rare and precious resource in the card.

SUMMARY OF THE INVENTION

In order to prevent these disadvantages, the invention proposes giving the card operating system the task of managing the allocated memory in order to reclaim the storage units which were previously allocated at the request of the means for running the program, but which have become irrelevant to the continued progress thereof.

The invention therefore relates more precisely to a process for managing the memory resources in a microcircuit card comprising, inter alia, alterable volatile and/or non-volatile memories and means for running a program, characterized in that storage spaces are allocated as requests are made, each space comprising a header and a number of storage units corresponding to the request of the said running means, in that updating of a number of references representative of a plurality of references of this kind, requesting at a given moment the data of the corresponding storage space, is organized in each header and in that chaining of the said headers is organized and can be scanned and in that an existing storage space is re-allocated if its number of references has been reduced to zero, if a new storage space is requested and if the number of storage units of the said new storage space is less than or equal to the number of storage units of the said existing storage space.

A reference may be a pointer (direct or indirect) designating a particular storage space in the program or in a sub-program. One feature of the invention therefore consists in storing in each header the number of references requiring the corresponding storage space and in updating this number. When the storage space is defined, this means that the program or a sub-program has requested the formation thereof. Its number of references is therefore equal to one. Other program or sub-program parts may then require the same storage space, as a result of which the number of references may increase. On the other hand, if, for example, a sub-program arrives at its end, all of the storage spaces it requires have their number of references decreased by one unit. Consequently, the number of references of a storage space can be reduced to zero. In this case, the invention allows under certain circumstances for re-allocation in the event of a new allocation request.

Re-allocation can only be effected (except at the end of chaining) if the storage space is larger than or preferably equal to the new request. In order to preserve the continuity of the chaining, a new header must be created in the event of re-allocation, allowing for access to the part of the storage space not re-allocated.

Other features of the invention allow for optimum management of the development of these storage spaces. E.g. it is necessary to prevent as far as possible the creation of storage spaces which, although they have become available, have too small a number of storage units to have a chance of being re-allocated. This can be achieved by means of the type of re-allocation procedure used, as will be seen hereinafter. The process of the invention moreover provides for the merging of storage spaces when they are adjacent in the said chaining and when their numbers of references have all been reduced to zero. A new unique header is therefore assigned to the new storage space resulting from merging of this kind. This merging process (also referred to as defragmentation) means that it is possible to limit the persistence of storage spaces which are too small. Several procedures allowing for the merging of adjacent storage spaces capable of being re-allocated will be described hereinafter.

BRIEF DESCRIPTION OF THE DRAWINGS

The invention will be more readily understood and other advantages thereof will be clearer from the following description of a process for managing the memory resources in a microcircuit card in accordance with the principle thereof, given solely by way of example and with reference to the accompanying drawings, in which.

DETAILED DESCRIPTION OF PREFERRED EMBODIMENTS

Figure 1:
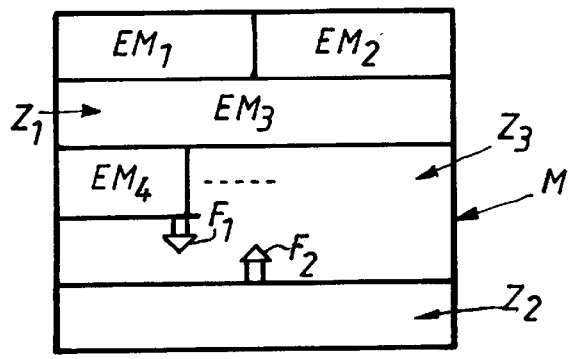
FIG. 1 is a diagram illustrating the arrangement of all of the available memory resources in the microcircuit card.

Referring more particularly to FIG. 1, M designates the entirety of the memory resources in a microcircuit card or "smart card". It is known that a card of this kind consists of a usually rectangular support of semi-rigid plastic material, including a cavity containing a microcircuit, some of the parts of which are connected to metallic connection lugs arranged on the surface of the card in the vicinity of the cavity in order to allow the microcircuit to be connected to an apparatus such as a cash dispenser, a portable telephone, a television decoder, etc.. The connection means that it is possible to control the progress of a specific program in relation to the proposed service. The contact lugs can be replaced by an aerial allowing for data exchange with the microcircuit. They may also coexist with an aerial of this kind.

The memory resources are divided into three variable parts. On the one hand, the "dynamic" allocation zone $Z_1$ is defined, the invention relating more particularly to the management thereof. This zone $Z_1$ is defined here by sending "high" addresses downwards. On the other hand, i.e. sending "low" addresses upwards, a "system" allocation zone $Z_2$ used for other allocation functions is defined. Between these two zones, there is a zone $Z_3$ available for increasing both the "dynamic" allocations and the "system" allocations. In other words, the zone $Z_1$ can extend in the direction of the arrow $F_1$ (decreasing addresses) at the expense of the zone $Z_3$ and the zone $Z_2$ can extend in the direction of the arrow $F_2$ (increasing addresses) at the expense of the zone $Z_3$. The zones $Z_1$ and $Z_2$ can therefore meet, in which case an error signal indicating the absence of available memory is generated. By virtue of the invention, it is possible to reduce the risk of this happening.

Figure 2:
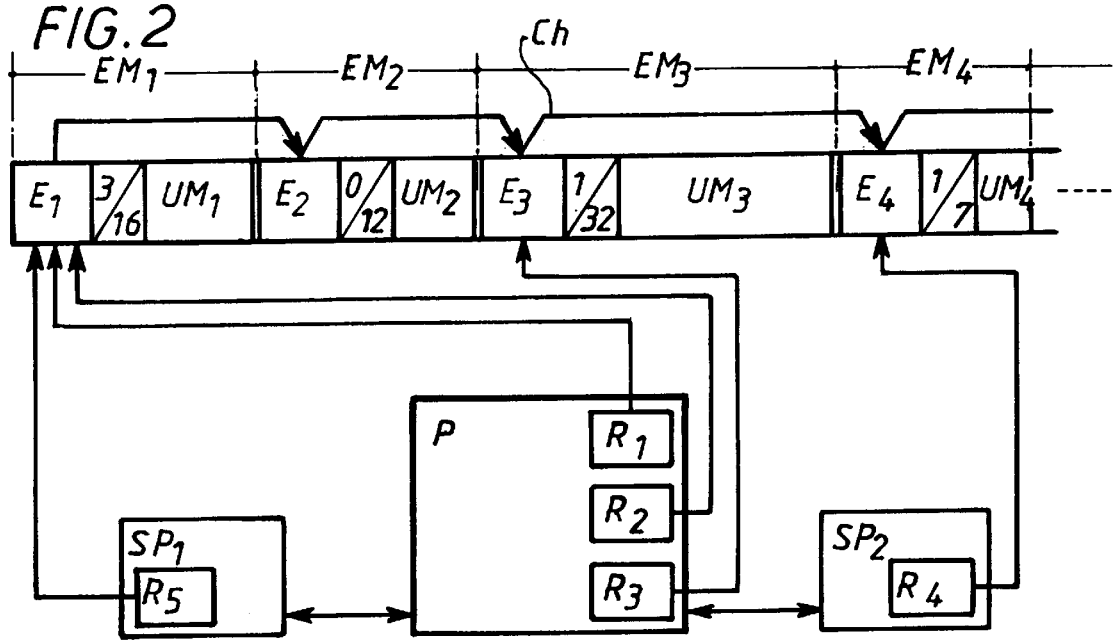
FIG. 2 is a block diagram illustrating the chaining of the dynamic allocation of storage spaces and the references of the program and sub-programs requiring the latter at a given moment.

FIG. 2 shows the organization of the storage spaces $EM_1$, $EM_2 \ldots EM_4$ of zone $Z_1$ referred to as dynamic allocations. Each storage space comprises a header $E_1$, $E_2$, $E_3$, $E_4 \ldots$ and a certain number of corresponding storage units $UM_1$, $UM_2$, $UM_3$, $UM_4$, etc.. Each header contains, inter alia, data relating to the number of references requesting the corresponding storage space at a given moment and to the number of storage units included by this storage space. FIG. 2 in fact shows that the storage spaces $EM_1$, $EM_2 \ldots EM_4 \ldots$ are designated by the references $R_1$, $R_2$, $R_3$ of a program and by the references $R_4$, $R_5$ of sub-programs $SP_1$ and $SP_2$, by way of example. More precisely, the space $EM_1$ is designated here by the references $R_1$ and $R_2$ of the program P and by the reference $R_5$ of the sub-program $SP_1$. Its number of references (indicated top left in the header of FIG. 2) is therefore equal to 3. It includes in this case 16 storage units (as indicated bottom right in the same header). The space $EM_2$, the number of storage units of which is equal to 12, does not form the subject of any allocation. Its number of references is therefore equal to 0. The space $EM_3$, the number of storage units of which is equal to 32, is designated by the reference $R_2$ of the program P and only by the latter, its number of references therefore being equal to 1. The storage space $EM_4$, the number of storage units of which is 7, is designated by the reference $R_4$ of the sub-program $SP_2$ and only by the latter. Its number of references is therefore equal to 1.

In other words, the number of references inscribed in the header of a storage space represents the number of injective relations established at a given moment between the program or a sub-program and the corresponding storage space.

Chaining Ch is moreover effected between all of the headers $E_1$, $E_2$, $E_3$, $E_4 \ldots$ of the dynamic allocation zone $Z_1$. If the number of references of one of the storage spaces (in this case $EM_2$) is reduced to 0, this means that no part of the program or sub-program is capable of consulting and/or altering it in the future. Consequently, this storage space may be re-allocated, if possible, when a new allocation request is formulated by the system.

Figure 3:
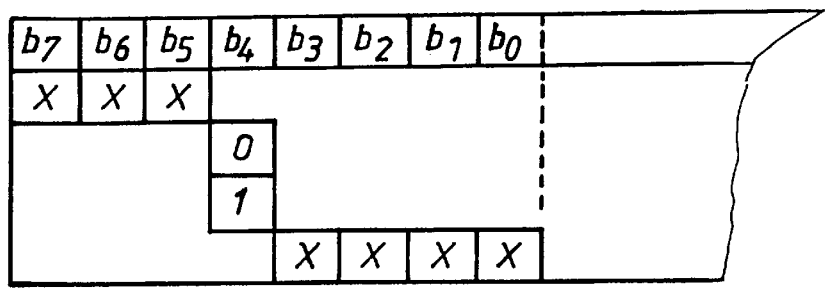
FIG. 3 shows the structure of part of the header of an allocated storage space.

FIG. 3 shows more clearly how the header of a storage space is organized. The latter, ensuring chaining, extends over two or three octets. On the first octet, the bits $b_5$, $b_6$ and $b_7$ indicate the type of storage space allocated, the bit $b_4$ indicates that the length of the storage space is coded onto an octet or onto two octets (according to its value) and the bits $b_0$ to $b_3$ represent the number of references of the storage space in question. When this number is zero, this means that the storage space can be re-allocated. This first octet is then followed by one or two octets (not shown) indicating the number of storage units included in this storage space (including the octets of the header), then the data inscribed in the storage space in question.

In this manner, referring once again to the example of FIG. 2, if a new allocation of, e.g. 10 octets is requested, it will be possible to allot the available storage space $EM_2$ thereto by coding the length on to an octet without having to create a new header in the chaining. An allocation of 9 octets may be satisfied under the same conditions, but by coding the number of storage units on to two octets. An allocation of a smaller number of storage units will require the creation of a new header in the chaining Ch in order to ensure the continuity of the latter and to have access, if necessary, to the storage units resulting from the segmentation taking place at the moment of re-allocation of the storage space $EM_2$.

On the other hand, in the example of FIG. 2, it will only be possible to effect an allocation of more than 10 octets by encroaching upon zone $Z_3$ and completing the chaining by means of a header $E_5$ defining a storage space $EM_5$.

Consequently, it would appear that the conditions required for re-allocation to be possible are as follows:
there must be a storage space the number of references of which has been reduced to 0,
a new storage space must be requested by the means for running the program and the number of storage units of the said new storage space must be less than or equal to the number of storage units of the existing storage space and capable of being re-allocated.

According to another feature of the invention, in order to prevent the existence of storage spaces which are too small and are unlikely to be re-allocated, storage spaces are merged when they are adjacent in the said chaining Ch and when their numbers of references have all been reduced to 0. The merging is accompanied by the creation of a new header corresponding to the new storage space resulting from the said merging. In this manner, referring once again to the example of FIG. 2, assuming that the storage space $EM_2$ is still available, if the reference $R_3$ no longer indicates the storage space $EM_3$, the number of references contained in its header $E_3$ is reduced to 0. Consequently, the two adjacent storage spaces $EM_2$ and $EM_3$ in the chaining Ch can be merged into one single storage space including 44 octets, including those forming the new header of the latter. If, at the same time, i.e. before a new re-allocation request, the reference $R_4$ no longer indicates the storage space $EM_4$, the entirety of the storage spaces $EM_2$, $EM_3$ and $EM_4$ can be merged into one single block of 51 octets, including one single header. In this case, as the storage space $EM_4$ is the last in the zone $Z_1$, the bottom of the zone $Z_1$, can then be displaced 51 octets upwards, thereby advantageously enlarging the zone $Z_3$.

Several criteria can be selected in order to decide upon the moment it is to be attempted to merge several adjacent storage spaces at advantageous moments in the progress of the program. E.g. when the number of references of a storage space has been reduced to 0, a check can be made immediately to ascertain whether one of the two adjacent storage spaces already includes a number of references equal to 0 and, if it does, it is possible to merge these two storage spaces and to immediately alter the chaining by creating a new header replacing the two previous ones.

It is also possible to scan the chaining at certain selected moments and to systematically record the value of the number of references of each header. Adjacent storage spaces are then merged if their numbers of references are reduced to 0. E.g. it is possible to scan the chaining in order to merge adjacent storage spaces after running a sub-program since, in that case, all of the references it contains no longer indicate the corresponding storage spaces and the numbers of references of the latter are all decreased simultaneously. The end of a sub-program is therefore a circumstance under which several numbers of references can be reduced to 0 simultaneously.

Another criteria may be reducing the zone $Z_3$, i.e. the available storage space not included in the chaining. When this non-allocated storage space reaches a predetermined lower limit value, it is possible to trigger a search procedure for the merging of adjacent storage spaces in the chaining Ch, specially scanning the latter in order to search for adjacent storage spaces the numbers of references of which have been reduced to 0.

Moreover, several methods of re-allocating an available storage space can be defined independently of this merging process (defragmentation) for storage spaces of the dynamic allocation zone $Z_1$. In this manner, when an allocation request is formulated, an available storage space (e.g. $EM_2$ when referring to FIG. 2) can be re-allocated as soon as it includes a sufficient number of storage units to satisfy the concomitant allocation request. Consequently, scanning of the chaining stops as soon as a storage space of sufficient dimensions is found and the headers of the chaining are altered in order to take account of this re-allocation.

In order to prevent the creation of residual storage spaces which are too small, it is possible to decide not to re-allocate a storage space during the scanning of the said chaining if the latter includes a number of storage units equal to that of the new storage space requested. If this is successful, scanning of the chaining can then be stopped immediately. As this type of re-allocation risks being relatively rare, it can be combined during scanning of the chaining with the storage of the header of the storage space the number of storage units of which least exceeds that of the storage space requested. A storage space of this kind, if it exists, is then re-allocated after scanning of the said chaining, creating a new header in the latter corresponding to the number of storage units remaining. If this number of storage units remaining is too small, it is also possible to decide not to re-allocate this free storage space, but to allocate a new space at the end of the zone $Z_1$.

The reverse option is also possible, i.e. to store during the scanning of the chaining the header of the storage space the number of storage units of which most exceeds that of the storage space requested and to re-allocate a storage space of this kind, if it exists, after scanning of the chaining, creating a new header in the latter corresponding to the number of storage units remaining. The relatively large residual storage space will have more chance of being re-allocated subsequently. There once again, it is possible to decide not to re-allocate the storage space selected in this manner if the number of storage units remaining is too small.

As a general rule, as soon as any storage space capable of being re-allocated (i.e. including a sufficient number of storage units or simply advantageous in view of the selection procedure chosen) is detected when scanning the chaining in the presence of an allocation request, an additional storage space is allocated (i.e. after $EM_4$ when referring to FIG. 2) and the chaining is completed by means of a corresponding additional header.

Moreover, if a large number of references indicate one particular storage space, i.e. if the number of references stored in the header of the latter reaches a predetermined maximum value, it is possible to decide to allocate this storage space permanently.

It should moreover be noted that, statistically, the last storage space of the chaining is often de-allocated before a new allocation request is formulated. In this case, it is advantageous to re-allocate at least some of the storage units of the last storage space just de-allocated as a priority, since, if the number of storage units requested is less than that of the last storage space just de-allocated, then the excess storage units will form part of the zone $Z_3$ and it will not be necessary to create a new header. These excess storage units will be re-allocated subsequently as a function of one or more subsequent allocation requests.

Conversely, if the allocation request relates to a larger number of storage units than is included by the said storage space, it is sufficient to complete the latter by means of additional adjacent storage units belonging to the zone $Z_3$ in order to obtain the required storage space.

We claim:

1. Process for managing the memory resources in a microcircuit card comprising alterable volatile and/or non-volatile memories and means for running a program, said method comprising:

allocating storage spaces as requests are made, each space comprising a header and a number of storage units corresponding to the request for the running means;

updating a number of references representative of a plurality of references of this kind, requesting at a given moment data of the corresponding storage space, is organized in each header; and organizing chaining of the headers such that the headers can be scanned and wherein an existing storage space is reallocated if its number of references has been reduced to zero, if a new storage space is requested and if the number of storage units of the new storage space is less than or equal to the number of storage units of the existing storage space.

2. Process according to claim 1, further comprising merging storage spaces when they are adjacent in the chaining and numbers of references of the storage spaces have all been reduced to zero; and assigning a new header to the new storage space resulting from merging of this kind.

3. Process according to claim 2, further comprising, when the number of references of a storage space has been reduced to zero, checking to ascertain whether an adjacent storage space already includes a number of references equal to zero and, if it does, merging these storage spaces.

4. Process according to claim 2, further comprising scanning the chaining and recording the value of the number of references of each header; and merging adjacent storage spaces if their number of references have been reduced to zero.

5. Process according to claim 4, wherein the chaining is scanned in order to merge adjacent storage spaces after running a sub-program.

6. Process according to claim 4, wherein the chaining is scanned in order to merge adjacent storage spaces when the non-allocated storage space reaches a predetermined lower limit.

7. Process according to claim 1, further comprising scanning the chaining; and re-allocating an available storage space if it includes a sufficient number of storage units to satisfy a concomitant allocation request.

8. Process according to claim 7, wherein a storage space is re-allocated during the scanning of the chaining as soon as the latter includes a number of storage units equal to a number of storage units equal to a new storage space requested.

9. Process according to claim 7, wherein the chaining is completely scanned for the purposes of re-allocation, and further comprising:

storing the header of the storage space the number of storage units of which least exceeds that of the storage space requested;

re-allocating a storage space of this kind, if it exists, after scanning of the chaining; and creating a new header in the re-allocated storage space corresponding to the number of storage units remaining.

10. Process according to claim 7, wherein the chaining is completely scanned for the purposes of possible re-allocation, and further comprising:

storing the header of the storage space the number of storage units of which most exceeds that of the storage space requested;

re-allocating a storage space of this kind, if it exists, after scanning of the chaining; and creating a new header in the re-allocated storage space corresponding to the number of storage units remaining.

11. Process according to claim 7, further comprising re-allocating an additional storage space as soon as any storage space capable of being re-allocated and including a sufficient number of storage units is detected when scanning the chaining in the presence of an allocation request, and wherein the chaining is completed by means of a corresponding additional header.

12. Process according to claim 1, further comprising permanently allocating a storage space if the corresponding number of references has reached a predetermined maximum value.

13. Process according to claim 1, wherein at least some of the storage units of the last storage space in the chaining are re-allocated as a priority if its number of references has been reduced to zero before another allocation request is prepared.

14. Process according to claim 13, wherein, if the last storage space is re-allocated, it is completely by means of adjacent additional storage units if the other allocation request relates to a larger number of storage units than is included by the last storage space.

15. Process according to claim 13, wherein, when the other allocation request relates to a smaller number of storage units than is included by the last storage space, the excess storage units are re-allocated as a function of one or more allocation requests subsequent to the other allocation request.

* * * * *